(12) United States Patent
Kotov et al.

(10) Patent No.: US 10,279,394 B2
(45) Date of Patent: May 7, 2019

(54) SYNTHESIS OF CHIRAL NANOPARTICLES USING CIRCULARLY POLARIZED LIGHT

(71) Applicant: THE REGENTS OF THE UNIVERSITY OF MICHIGAN, Ann Arbor, MI (US)

(72) Inventors: Nicholas A. Kotov, Ypsilanti, MI (US); Jihyeon Yeom, Ypsilanti, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 550 days.

(21) Appl. No.: 14/940,845

(22) Filed: Nov. 13, 2015

(65) Prior Publication Data
US 2016/0167136 A1 Jun. 16, 2016

Related U.S. Application Data

(60) Provisional application No. 62/079,950, filed on Nov. 14, 2014.

(51) Int. Cl.
*C01B 19/00* (2006.01)
*B22F 9/24* (2006.01)

(52) U.S. Cl.
CPC ............. *B22F 9/24* (2013.01); *C01B 19/007* (2013.01); *C01P 2004/17* (2013.01); *C01P 2006/60* (2013.01)

(58) Field of Classification Search
CPC ...... B22F 9/24; C01B 19/007; C01P 2004/17; C01P 2006/60
See application file for complete search history.

(56) References Cited

PUBLICATIONS

Srivastava, Sudhanshu, et al. "Light-controlled self-assembly of semiconductor nanoparticles into twisted ribbons." Science 327. 5971 (2010): 1355-1359.*
Lilly, G. Daniel, et al. "Helical assemblies of gold nanoparticles." Small 7.14 (2011): 2004-2009.*
Zhu, Jia, et al. "Formation of chiral branched nanowires by the Eshelby Twist." Nature nanotechnology 3.8 (2008): 477.*
Zhang, Chuanyong, et al. "Preparation of helical CdS nanotubes using a sol—gel transcription approach." Materials Letters 102 (2013): 50-52.*
Liu, Shaohua, et al. "Synthesis of enantiopure carbonaceous nanotubes with optical activity." Angewandte Chemie 125.27 (2013): 6996-7000.*

(Continued)

*Primary Examiner* — Richard M Rump
(74) *Attorney, Agent, or Firm* — Harness, Dickey & Pierce, P.L.C.

(57) ABSTRACT

New methods of forming chiral nanoparticles (e.g., nano structures) are provided. The method comprises directing circular polarized light (CPL) towards a nanoparticle precursor to cause a photo induced reaction of the nanoparticle precursor and induce chirality to form a stable chiral nanoparticle. In this manner, CPL is used to template chirality onto nanoparticles without use of any chiral component or chiral ligands for inducing chirality to the particle in such a method. The nanoparticles may include a variety of light-absorbing materials (e.g., CdTe, CdS, Au, and the like). Such methods provide a rapid, simple, and inexpensive way of forming chiral nanoparticles that have long term chiral stability.

17 Claims, 17 Drawing Sheets

(56) References Cited

PUBLICATIONS

Wang, Feng, et al. "Simultaneous discrimination of handedness and diameter of single-walled carbon nanotubes (SWNTs) with chiral diporphyrin nanotweezers leading to enrichment of a single enantiomer of (6, 5)-SWNTs." Journal of the American Chemical Society 132.31 (2010): 10876-10881.*

Suzuki, Nozomu, et al. "Chiral graphene quantum dots." ACS nano 10.2 (2016): 1744-1755.

Yeom, Jihyeon, et al. "Chiral templating of self-assembling nanostructures by circularly polarized light." Nature materials 14.1 (2015): 66.

* cited by examiner

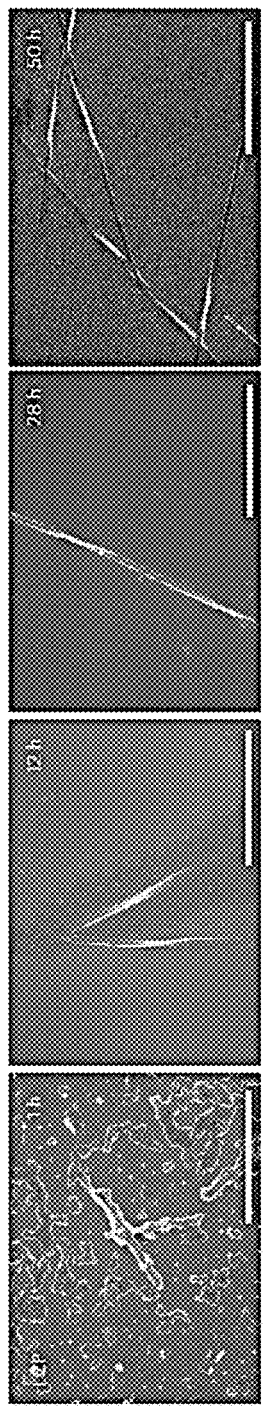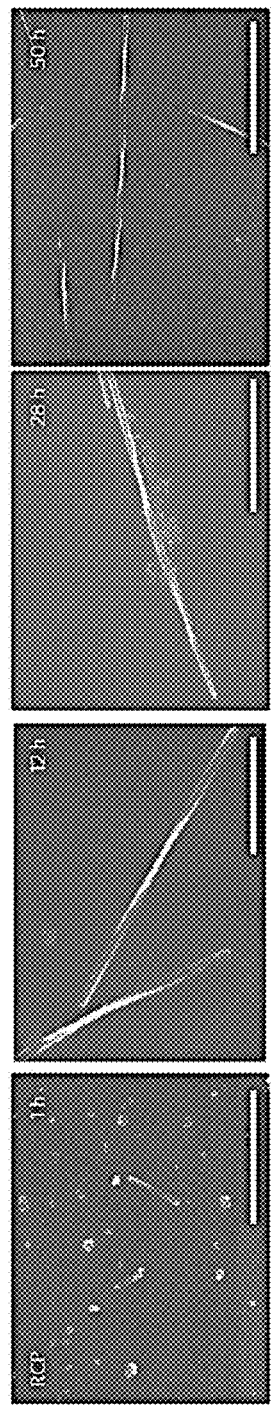
FIG. 1A
FIG. 1B

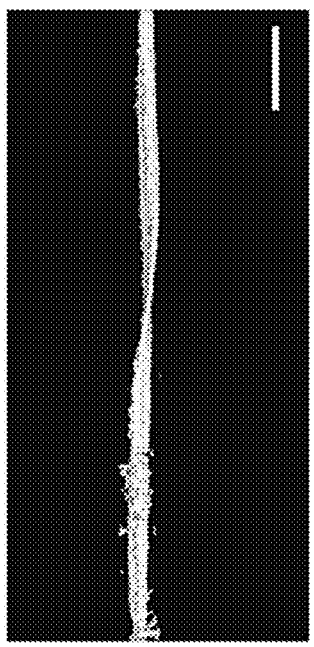
FIG. 2A
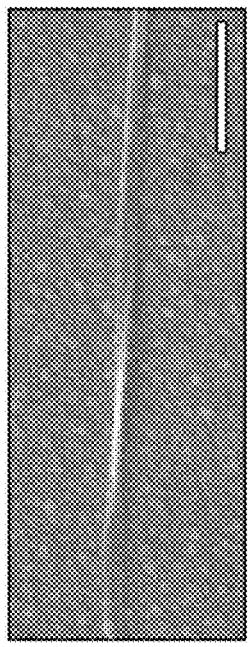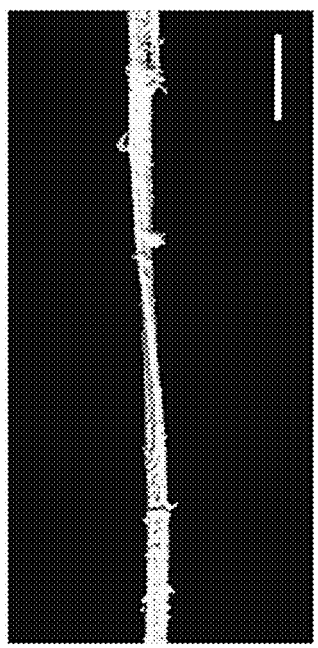
FIG. 2B
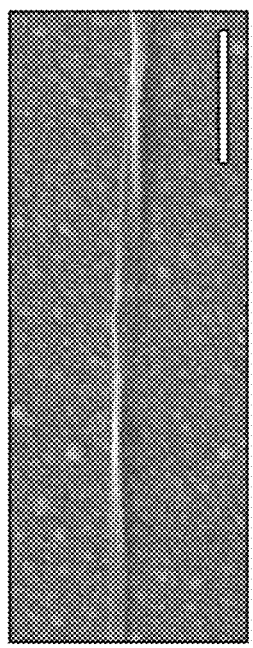
FIG. 2C
FIG. 2D

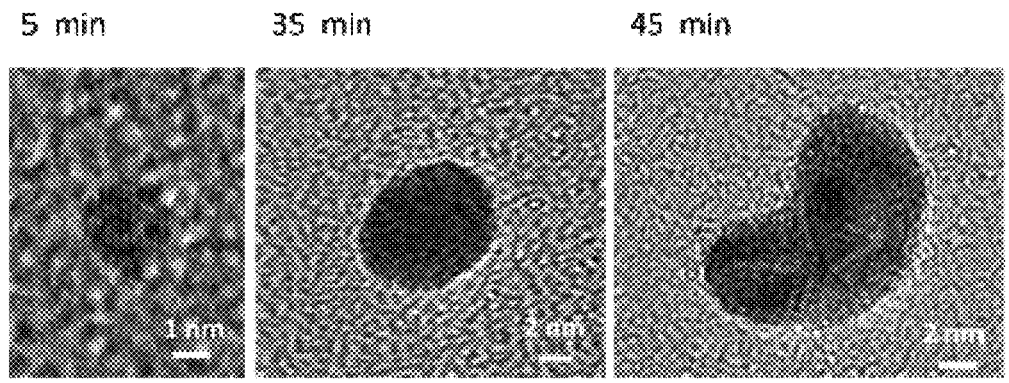
FIG. 7A   FIG. 7B   FIG. 7C
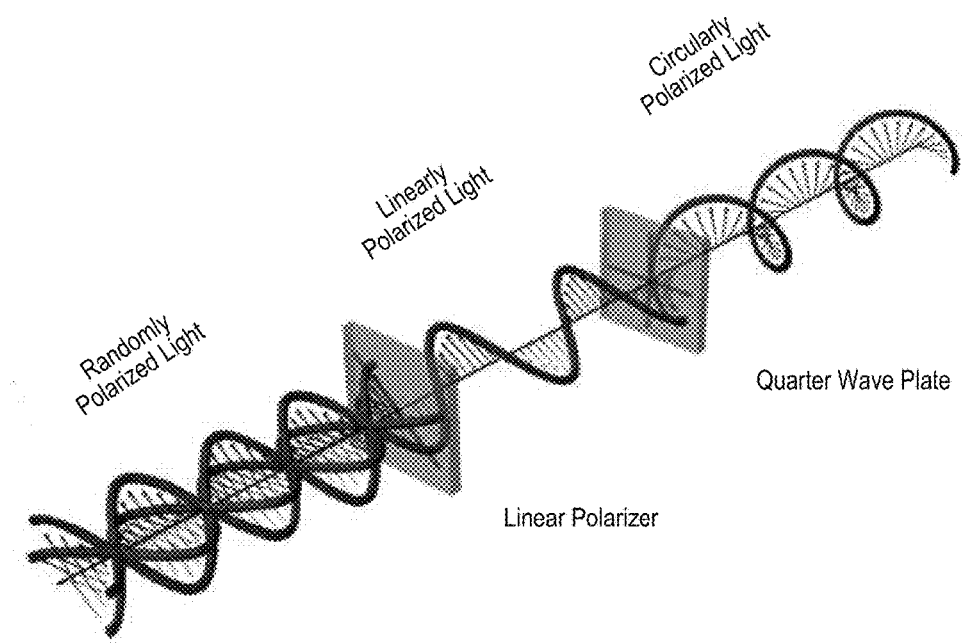
FIG. 8

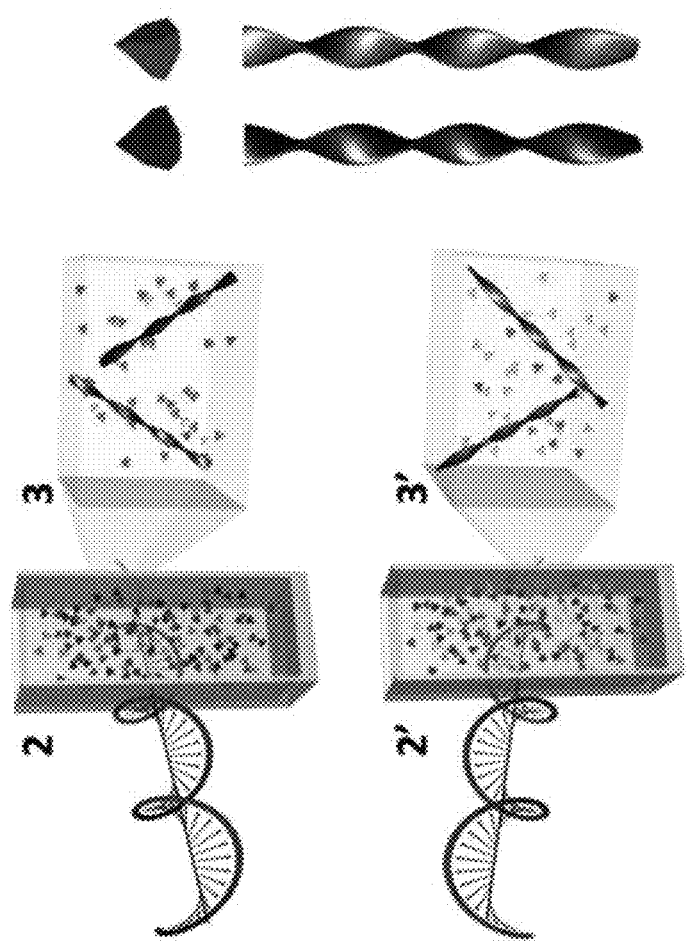
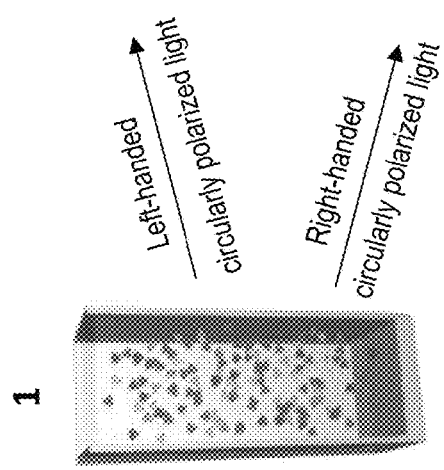
FIG. 9

SYNTHESIS OF CHIRAL NANOPARTICLES USING CIRCULARLY POLARIZED LIGHT

CROSS-REFERENCE TO RELATED APPLICATIONS

This application claims the benefit of U.S. Provisional Application No. 62/079,950, filed on Nov. 14, 2014. The entire disclosure of the above application is incorporated herein by reference.

GOVERNMENT RIGHTS

This invention was made with government support under W911NF-10-1-0518 awarded by the Army/ARO. The Government has certain rights in the invention.

FIELD

The present disclosure relates to methods for synthesizing stable chiral nanoparticles by use of circular polarized light and stable chiral nanoparticles made therefrom without any chirality-inducing ligands.

BACKGROUND

This section provides background information related to the present disclosure which is not necessarily prior art.

Chirality of gold and other nanoparticles (NPs) has been actively studied in the last decade of nanoscience research, due to its wide range of possible applications. The interest in the synthesis of chiral nanostructures has been fueled by the potential application of chiral nano structures in bio sensing, telecommunication, display technologies, diffraction-free patterning, and chiral catalysis. Certain materials with nanoscale chirality are known to strongly rotate the polarization of linearly polarized (LinP) and circularly polarized light (CPL). Such optical effects in nano materials with different chiral geometries are being actively investigated as a part of chiral photonics and plasmonics. The opposite effects, i.e., the transfer of spin angular momenta of circularly polarized photons to matter and its subsequent nanoscale or atomic restructuring, retaining the "memory" of circular polarization, are not well known or understood.

Conventionally, in order to impart chirality, biological chiral ligands are used in conjunction with precursors to make chiral nanoparticles and chiral structures, for instance L-glutathione ligand or amino acid ligands. Natural amino acids and sugars exist predominantly as left-handed (LH) and right-handed (RH) enantiomers, respectively. However, associating ligands with nanoparticles requires additional processing steps and limits the types of nanoparticle structures and compositions that can be formed. It would be desirable to have a new technique for induced restructuring of NP systems, thus providing a new, powerful, and versatile tool for nanochemistry of chiral materials.

SUMMARY

This section provides a general summary of the disclosure and is not a comprehensive disclosure of its full scope or all of its features.

In certain aspects, the present disclosure contemplates a method of forming a chiral nanoparticle. The method comprises directing circular polarized light towards a nanoparticle precursor to cause a photo induced reaction of the nanoparticle precursor and to induce chirality therein thus forming the chiral nanoparticle. In certain variations, the nanoparticle precursor and the chiral nanoparticle are free of any chiral component or chiral ligands for inducing chirality. The nanoparticle precursor may optionally comprise a first component for forming the chiral nanoparticle and a second component that serves as an achiral capping agent on the chiral nanoparticle. In other aspects, the nanoparticle precursor is a dispersion of a first component for forming the chiral nanoparticle in an aqueous medium.

In yet other aspects, the nanoparticle precursor comprises an element selected from the group consisting of: gold, cadmium, silver, copper, nickel, iron, carbon, platinum, silicon, mercury, lead, molybdenum, iron, and combinations thereof. The chiral nanoparticle may thus be selected from the group consisting of: gold, silver, copper, nickel, iron, carbon, platinum, silicon, CdTe, CdSe, CdS, HgTe, HgSe, HgS, PbTe, PbSe, PbS, $MoS_2$, $FeS_2$, FeS, FeSe, and combinations thereof. In other aspects, the chiral nanoparticle is selected from the group consisting of: gold, CdTe, CdSe, CdS, and combinations thereof. In certain variations, the chiral nanoparticle is a nanoribbon. The chiral nanoparticle may have a length of greater than or equal to about 2 nm to less than or equal to about 5 µm. In other aspects, the circular polarized light is a left handed circularized polarized light, so that the chiral nanoparticle displays a left-handed chirality. In other aspects, the circular polarized light is a right handed circularized polarized light, so that the chiral nanoparticle displays a right-handed chirality. The chiral nanoparticle formed from such a process desirably exhibits long-term stability and in certain aspects, can maintain its chiral properties for greater than or equal to about 3 years.

In yet other aspects, the present disclosure contemplates a chiral nanoparticle comprising a light-absorbing material selected from the group consisting of: gold, silver, copper, nickel, iron, carbon, platinum, silicon, CdTe, CdSe, CdS, HgTe, HgSe, HgS, PbTe, PbSe, PbS, $MoS_2$, $FeS_2$, FeS, FeSe, and combinations thereof. The nanoparticle exhibits chirality and is substantially free of any chirality-inducing ligands, such as organic chirality-inducing ligands. In certain aspects, the light-absorbing material is an inorganic material nanoparticle selected from the group consisting of: gold, silver, copper, nickel, iron, platinum, silicon, CdTe, CdSe, CdS, HgTe, HgSe, HgS, PbTe, PbSe, PbS, $MoS_2$, $FeS_2$, FeS, FeSe, and combinations thereof. In certain other aspects, the chiral nanoparticle is selected from the group consisting of: gold, CdTe, CdSe, CdS, and combinations thereof. The chiral nanoparticle may exhibit right-handed chirality or left-handed chirality. In certain variations, the chiral nanoparticle is stable and maintains its chirality for greater than or equal to about 1 year. In other variations, the chiral nanoparticle is stable and maintains its chirality for greater than or equal to about 3 years. The chiral nanoparticle may optionally have the shape of a nanoribbon.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1(A)-1(F) show self-assembly of CdTe NPs into twisted nanoribbons induced by illumination with circularly polarized light (CPL). FIGS. 1(A) and 1(B) are SEM images of the nanoribbons assembled with left-handed circularly polarized light (LCP) (FIG. 1(A)) and right-handed circularly polarized light RCP (FIG. 1(B)) as a function of time exposure for 1 hour, 12 hours, 28 hours and 50 hours. All scale bars are 1 μm. FIGS. 1(C) and 1(D) are tapping-mode atomic force microscopy (AFM) topographic (left) and phase (right) images of left-handed (LH) nanoribbon FIG. 1(C) and right-handed (RH) nanoribbon (D). FIG. 1(E) shows distributions of LH, RH, and nontwisted nanoribbons obtained after 50 hours of illumination with RCP, LCP, unpolarized (UnP), linearly polarized (LinP) light, and in the dark. FIG. 1(F) is an ensemble a circular dichroism (CD) spectra (solid line) and g factor (dotted line) of dispersions of left-handed (LH) nanoribbons and right-handed (RH) nanoribbons obtained after 50 hours of CPL illumination. Linear dichroism effects that could be associated with adsorption on the walls of the cuvette and other spontaneous alignment of linear nanostructures have negligible contribution to the chiroptical properties as indicated by the identity of the CD spectra obtained with and without stirring of the dispersion.

FIGS. 2(A)-2(H) show chirality of single nanoribbons. FIGS. 2(A) and 2(B) are surface renderings of the 3D TEM tomographic reconstruction of LH nanoribbon (FIG. 2(A)) and RH nanoribbon (FIG. 2(B)). Scale bars are 100 nm. FIGS. 2(C) and 2(D) show SEM images of a single LH nanoribbon (FIG. 2(C)) and a single RH nanoribbon (FIG. 2(D)). Scale bars are 500 nm. FIGS. 2(E) and 2(F) show CD spectra and calculated g-factor spectra for single LH (FIG. 2(E)) and RH (FIG. 2(F)) nanoribbons in FIGS. 2(C) and 2(D), respectively. FIGS. 2(G) and 2(H) are computational models of the LH FIG. 2(G) and RH FIG. 2(H) nanoribbons used in the FEM calculations of chiroptical properties based on numerical solutions of the Maxwell equations.

FIGS. 3(A)-3(I) show a mechanism of enantioselective assembly of NPs. FIG. 3(A) shows FTIR spectra of original CdTe NPs, purified nanoribbons (NRs) and of the supernatant (SN) obtained after 50 hour of illumination time. FIG. 3(B) is a schematic illustration of CdTe phase transition to CdS. FIGS. 3(C) and 3(E) show models of chiral NPs (FIG. 3(C)) and chiral NP clusters (FIG. 3(E)) used in calculations of chiroptical properties. FIGS. 3(D) and 3(F) show simulated spectra and g-factors for FIG. 3(D) L/R-NPs and FIG. 3(F) L/R-clusters of NPs. Nomenclature for NPs and their clusters is based on their positive (L) or negative (R) optical activity. FIGS. 3(G) and 3(H) show HAADF STEM images of TGA-stabilized truncated tetrahedral CdTe NPs. Scale bars are 15 nm FIG. 3(G) and 5 nm FIG. 3(H). FIG. 3(I) shows high resolution TEM image of TGA-stabilized truncated tetrahedral CdTe NPs.

FIGS. 4(A)-4(G) show molecular dynamic and experimental studies of the self-assembly of chiral NPs. FIG. 4(A) show atomistic models of NPs with LH and RH truncations used in MD simulations. FIG. 4(B) shows a detailed view of a single NP in aqueous environment and of the counter ions used in the MD simulations. FIG. 4(C) is a fragment of the simulated self-assembled ribbon from (top view) displaying packing of NPs. Scale bars in FIGS. 4(A), 4(B), and 4(C) are 1 nm. FIGS. 4(D) and 4(E) show the side views of simulated NP ribbon with LH (FIG. 4(D)) and RH (FIG. 4(E)) truncated NPs. Dihedral angle θ determines the pitch of the nanoribbons. FIGS. 4(F) and 4(G) show SEM images of experimental assemblies spontaneously formed in dark from chiral CdTe NPs stabilized by L-cysteine (FIG. 4(F)) and D-cysteine (FIG. 4(G)). Scale bars are 1 μm.

FIGS. 5(A)-5(D) show HR-TEM images of left handed (LH) (FIGS. 5(A) and 5(B)) and right handed (RH) (FIGS. 5(C) and 5(D)) chiral gold nanoparticles obtained after 50 minutes illumination.

FIG. 6 shows a circular dichroism (CD) spectra of LH (black) and RH (red) chiral gold nanoparticles.

FIGS. 7(A)-7(C) show SEM images of chiral nanoparticles at various illumination times, 5 minutes (FIG. 7(A)), 35 minutes (FIG. 7(B)), and 45 minutes (FIG. 7(C)).

FIG. 8 is a schematic illustration of an optical set up for a circularly polarized light (CPL)-templated assembly process for inducing polarity in nanoparticle precursors.

FIG. 9 shows a schematic illustration of a CPL-induced self-assembly process.

Corresponding reference numerals indicate corresponding parts throughout the several views of the drawings.

DETAILED DESCRIPTION

Figure 1C:
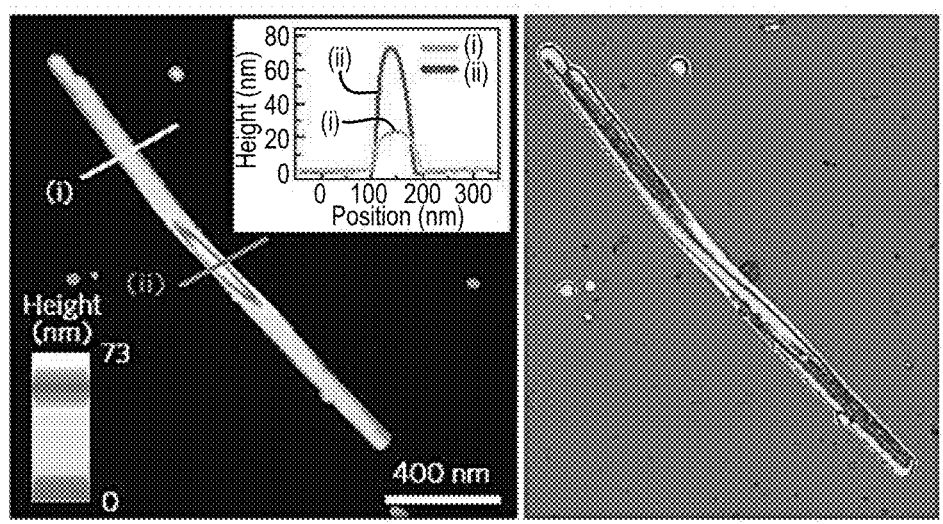

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

It should be understood for any recitation of a method, composition, device, or system that "comprises" certain steps, ingredients, or features, that in certain alternative variations, it is also contemplated that such a method, composition, device, or system may also "consist essentially of" the enumerated steps, ingredients, or features, so that any other steps, ingredients, or features that would materially alter the basic and novel characteristics of the invention are excluded therefrom.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges.

Example embodiments will now be described more fully with reference to the accompanying drawings.

Control of chiroptical property in a visible region (e.g., in a visible portion of the electromagnetic spectrum) has been of growing focus, especially for bio sensing and optoelectronic devices, by way of non-limiting example. In particular, chirality of gold and other nanoparticles (NPs) are of great interest for use in a wide range of applications, including catalysis and biosensing. Typically, chirality-inducing ligands, such as biological chiral ligands, are used to make the chiral nanoparticles and chiral structures, for instance L-glutathione ligand or amino acids. Gold nanoparticles are particularly interesting because they exhibit strong optical activity. Interestingly, CD signals are observed not only from the chiral ligand itself, but also from surface plasmon resonance region, which manifests in the metal-based electronic transition in the visible region. The ability to synthesize chiral enantiopure NPs and nanostructures as provided by certain aspects of the present disclosure represents a significant development in the area.

In various aspects, the present disclosure contemplates rapid, simple, and inexpensive methods of forming chiral nanoparticles that have long term chiral stability. In one aspect, the present disclosure provides a method of forming a chiral nanoparticle that comprises directing circular polarized light towards a nanoparticle precursor. The circular polarized light causes a photo-induced reaction of the nanoparticle precursor and further induces chirality therein, which thus forms the chiral nanoparticle. Light in the form of a plane wave in space may be linearly polarized. Light is a transverse electromagnetic wave, but natural light is generally unpolarized with all planes of propagation being equally probable. Circular polarized light (CPL) typically has two perpendicular electromagnetic waves of equal amplitude and 90° difference in phase and may have either a left-handed orientation (where the electric vector of light originating from a source appears to rotate clockwise) or a right-handed orientation (where the electric vector of light originating from a source appears to rotate counter-clockwise). Circular polarized light may be produced by passing linearly polarized incident light through a quarter-wave plate at an angle of 45° to the optic axis of the plate, for example. Elliptical polarized light is light that has two perpendicular waves of unequal amplitude that differ in phase by 90°. In certain alternative aspects, elliptical polarized light may be used to induce chirality similar to circular polarized light.

Chirality of a nanoparticle means that a nanoparticle or nano structure exhibits asymmetrical optical activity with different handedness (clockwise to form left handed chirality (S or L orientation) and counter-clockwise to form right handed chirality (R or D orientation). By directing circular polarized light at the precursor(s) material capable of absorbing and retaining polarization information of incident photons, it is believed that a templating process occurs in accordance with the present teachings. Such templating appears to convert the spin angular momenta of photons into structural changes in matter, thus causing inducement of chirality in nanoparticles by enantioselective photo activation, followed by a reaction (e.g., photo oxidation) and self-assembly to form structures exhibiting chirality. In accordance with certain aspects of the present disclosure, if the circular polarized light directed towards the nanoparticle precursor is a left-handed circularized polarized light, the chiral nanoparticle is templated to display a left-handed chirality. If the circular polarized light is a right-handed circularized polarized light, the chiral nanoparticle displays a right-handed chirality.

A "nanoparticle" is a solid or semi-solid material that can have a variety of shapes or morphologies, and may include nanostructures or assemblies of nanoparticles. However, a nanoparticle is generally understood by those of skill in the art to mean that the particle/structure has at least one spatial dimension that is less than or equal to about 10 μm (10,000 nm). In certain variations, a nanoparticle's longest dimension is less than or equal to about 5 μm. In certain aspects, a nanoparticle has at least one spatial dimension, such as length, that is greater than or equal to about 2 nm and less than or equal to about 5 μm, optionally greater than or equal to about 2 nm and less than or equal to about 3 μm, optionally greater than or equal to about 2 nm and less than or equal to about 1 μm, optionally greater than or equal to about 2 nm and less than or equal to about 500 nm, optionally greater than or equal to about 2 nm and less than or equal to about 100 nm. It should be noted that other dimensions might be greater than these ranges. In certain embodiments, the nanoparticles formed in accordance with the present methods are nanorods, nanoribbons, or nanoassemblies. In certain aspects, the chiral nanoparticles are nanoribbons.

The nanoparticle precursor used to form the chiral nanoparticle in accordance with certain aspects of the present disclosure may comprise an element selected from the group consisting of: gold, cadmium, silver, copper, nickel, iron, carbon, platinum, silicon, mercury, lead, molybdenum, iron, and combinations thereof. It is desired that such precursor materials are capable of absorbing light so that they may undergo a photo activation reaction, as well as light induced self-assembly. The chiral nanoparticle may thus comprise or be formed from a light-absorbing material. In certain aspects, the chiral nanoparticle formed in accordance with certain aspects of the present disclosure is selected from the group consisting of: gold, silver, copper, nickel, iron, carbon, platinum, silicon, CdTe, CdSe, CdS, HgTe, HgSe, HgS, PbTe, PbSe, PbS, $MoS_2$, $FeS_2$, FeS, FeSe, and combinations thereof. In yet other aspects, the chiral nanoparticle formed is an inorganic nanoparticle, for example, selected from the group consisting of: gold, silver, copper, nickel, iron, platinum, silicon, CdTe, CdSe, CdS, HgTe, HgSe, HgS, PbTe, PbSe, PbS, $MoS_2$, $FeS_2$, FeS, FeSe, and combinations thereof. In certain other aspects, the chiral nanoparticle formed in accordance with certain aspects of the present disclosure is selected from the group consisting of: Au, CdTe, CdSe, CdS, and combinations thereof. In other alternative variations, the nanoparticles can be selected from the group consisting of: silver, copper, nickel, carbon, as well as a variety of semiconductors, including direct and indirect band gap semiconductors including those listed above, and any combinations thereof.

In accordance with certain aspects of the present disclosure, the methods form chiral nanoparticles/nano structures without the need for any ligands as a means to induce chirality in the nanoparticle. Thus, in certain aspects the nanoparticle precursor and the chiral nanoparticle are free of any ligands for inducing chirality (e.g., chirality-inducing ligands). By "substantially free" it is meant that the compound or ligand species is absent, for example, only present in the chiral nanoparticle as an unintentional impurity at less than or equal to about 0.1% by weight, optionally less than or equal to about 0.01% by weight, and in certain preferred aspects, 0% by weight of the chiral nanoparticle.

The nanoparticle precursor may be a racemic mixture prior to exposure to the circular polarized light, whereas after the treatment, an enantiomeric mixture having greater than or equal to about 25% enantiomers and optionally greater than or equal to about 30% enantiomers is produced. In certain variations, the nanoparticle precursor comprises a first component for forming the chiral nanoparticle and a second component that serves as a capping agent on the chiral nanoparticle. A suitable capping agent may be an achiral capping agent, such as thioglycolic acid (TGA). The nanoparticle precursor is desirably a dispersion of a first component, and optionally of the second component, for forming the chiral nanoparticle in an aqueous medium. Such nanoparticle dispersions are desirably stable at ambient conditions.

The chiral nanoparticle formed in accordance with various aspects of the present disclosure is stable and maintains its chiral properties for greater than or equal to about 1 year, optionally greater than or equal to about 2 years, and in certain aspects, greater than or equal to about 3 years. Such chiral nanoparticles are useful in a variety of applications, including but not limited to, bio sensing, optical materials, telecommunication, display technologies, diffraction-free patterning, and chiral catalysis.

The present disclosure thus contemplates chiral templating of self-assembling nanostructures by circularly polarized light. The high optical and chemical activity of certain nanoparticles (NPs) signifies that spin angular momenta of photons can be converted into structural changes in matter. It is demonstrated that illumination of dispersions of racemic CdTe NPs with right-handed or left-handed circularly polarized light (CPL) induces the formation of right-handed or left-handed twisted nanoribbons with an enantiomeric excess of greater than or equal to about 30%, which is about 10 times higher than that of typical CPL-induced reactions. Use of linearly polarized light or dark conditions led instead to straight nanoribbons with no apparent chirality. CPL "templating" of NP assemblies is based on the enantioselective photo activation of chiral NPs and clusters, followed by their photooxidation and self-assembly into nanoribbons with specific helicity because of chirality-sensitive interactions between the NPs. The ability of NPs to retain the polarization information of incident photons will open many pathways for the synthesis of chiral photonic materials and allow for better understanding of the origins of biomolecular homochirality.

By way of background, materials with nanoscale chirality are known to strongly rotate the polarization of linearly polarized (LinP) and circularly polarized light (CPL). Such optical effects in nanomaterials with different chiral geometries are being actively investigated as a part of chiral photonics and plasmonics. The opposite effects, i.e., the transfer of spin angular momenta of circularly polarized photons to matter and its subsequent nanoscale or atomic restructuring, retaining the "memory" of circular polarization, are much less known. The possibility of such effects at the atomic and nanometer scale is indicated by, for instance, the formation of spiral nano-needles with controlled helicity during laser ablation of bulk metallic tantalum with CPL; however, the underlying mechanism is not well understood. The transfer of spin angular momenta in high intensity laser beams has been observed for Bose-Einstein condensates, ensembles of cold atoms, and microscale colloids. These special chromophores/scatterers acquired circular or spiral motion while being illuminated by high intensity CPL. However, it is difficult to convert the photon spin into permanent structural changes of atomic and particulate systems, due to their achiral symmetry, structural barriers for channeling the rotational energy into chemical bonds, and fast quenching of rotational motion by the media.

The transfer of spin angular momentum into particle rotation is observed here for a wide range of sizes and molar masses (M) of particles—from $M \approx 10^2$ for ensembles of cold atoms to $M \approx 5 \times 10^{12}$ for conventional microscale colloids. It is possible to observe CPL effects for nanoparticles (NPs) that are intermediate in mass and size between atom clusters and microparticles, and are similar in masses to Bose-Einstein condensates ($M \approx 10^7$). NP dispersions stable at ambient conditions are more convenient to use than some of these chromophores/scatterers, and can be more reactive than polymeric colloids or bulk tantalum. In addition, the photochemical effects of light with different handedness are enhanced in NPs, because of their larger physical size compared to chiral organic molecules.

CPL-induced restructuring of NP systems in accordance with the present disclosure provides a new, powerful, and versatile tool for (nano)chemistry of chiral materials. As noted above, in addition to the interest in potential applications for chiral nano structures, like bio sensing, telecommunication, display technologies, diffraction-free patterning, and chiral catalysis, additional motivation to study long-term structural changes caused by CPL in matter is evidenced by the ongoing discussion about the origin of homochirality in natural compounds. Natural amino acids and sugars exist predominantly as left-handed (LH) and right-handed (RH) enantiomers, respectively. Illumination with CPL was recently suggested as one of the plausible causes of homochirality. However, the mechanism of how CPL can lead to homochirality of organic molecules is not known. Several chemical routes are being debated, including chiral amplification.

Self-assembly of NPs is one of the mechanisms believed to be influenced by CPL. Such expectations are based on (a) atomic and nanoscale chirality of individual NPs, (b) amplification of circular polarization effects in NP assemblies, and (c) sensitivity of self-assembly processes to small changes in interparticle interactions. In addition, inorganic NPs represent a convenient building block for nanoscale synthesis, affording a variety of pathways to geometrically complex nano structures.

Based on this hypothesis, the effects of CPL on the assembly of water-soluble NPs under ambient conditions are explored here. A dispersion of CdTe NPs, stabilized by achiral capping agent thioglycolic acid (TGA) is illuminated either by left-handed circularly polarized light (LCP) or right-handed circularly polarized light (RCP) with a wavelength of 543 nm.

More specifically, one technique for synthesizing and analyzing twisted or chiral nanoribbons is as follows. CdTe nanoparticles were synthesized with a reduced amount of thioglycolic acid (TGA) stabilizer (the TGA to $Cd^{2+}$ ratio was about 1.1). To induce the self-assembly of CdTe NPs, templating chirality of CPL, the amount of TGA in the dispersion was significantly reduced by precipitation and redispersion of CdTe NPs in purified water at pH=9. The pH was adjusted by the addition of 0.1 M NaOH, and the precipitation was done by addition of methanol followed by centrifugation for 20 min. This CdTe dispersion revealed no circular dichroism (CD) peaks in the visible range and has equal cumulative absorbance for LCP and RCP photons at 543 nm.

The dispersion was placed in a dark room, and then exposed to circularly polarized light. An optical set-up for the CPL induced assembly is shown in FIG. 8. A green (543 nm) helium-neon laser with random polarization of emitted photons (Research Electro-Optics, Inc. Boulder, Colo.) was used as a light source. The laser emission was transformed to CPL by directing it through a linear polarizer and a quarter-wave plate. Because the quarter-wave plate is made with a birefringent material, the linearly polarized light turned to CPL by passing through the quarter-wave plate with the 45° transmission angle. By rotating the quarter-wave plate 90° relative to the previous angle, the handedness of CPL is changed. As the NPs were assembled into nanoribbons by illuminated CPL, the orange color was turned to dark green.

The morphology of assembled nanoribbons were analyzed by tapping mode atomic force microscopy (AFM) with NTEGRA Spectra tips (NTEGRA Spectra at Korea Basic Science Institute, NT-MDT), scanning electron microscopy (SEM, FEI Nova), and transmission electron microscopy (TEM, JEOL 3011) To measure optical activity, the nanoribbons were separated from the solution by gentle centrifugation (bench-top centrifuge, 3000 rpm, 3 min) and redispersion in distilled and deionized water. The CD spectra were obtained by a JASCO J-815 instrument. The Fourier transform infrared spectroscopy (FTIR), energy dispersive spectrometry (EDS, JEM-2200FS, JEOL) and X-ray photoelectron spectra (XPS, Kratos Analytical AXIS Ultra) were used to exam the composition of nanoribbons.

Figure 1D:
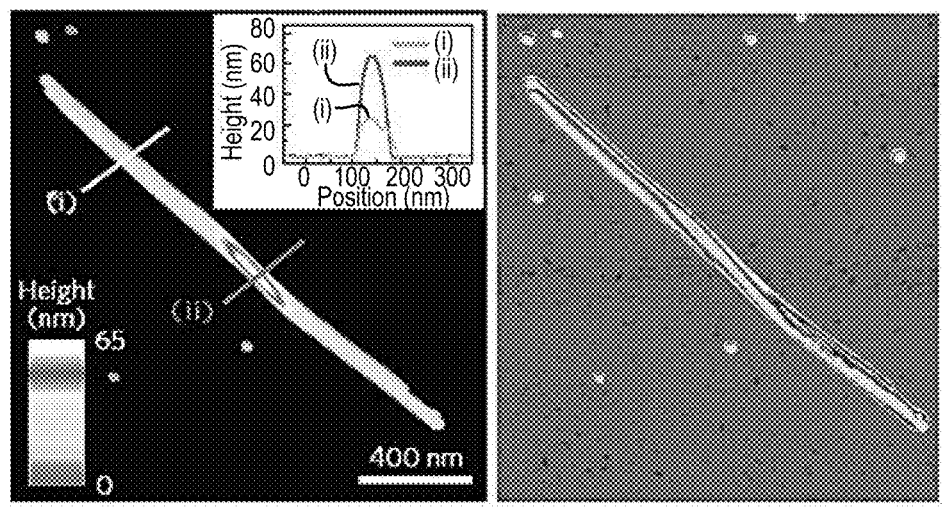

It was expected that twisted nanoribbons would be formed, but it was unclear whether polarization of light would have an effect on their assembly pattern and geometry. CPL-induced transformations of NPs were examined after 1, 12, 28, 35 and 50 hours of illumination (FIGS. 1(A) and 1(B)). The temporal progression of the products included short 50-200 nm rods (1 h) that evolved into 1-2 μm twisted nanoribbons (12 h) and subsequently into 2-3 μm longer nanoribbons (28 h). After 50 h of illumination, twisted nanoribbons with total lengths, pitch lengths, and diameters of 3±0.5 μm, 800±20 nm, and 50±5 nm, respectively, were the predominant products of the photo-induced reaction (FIGS. 1(C) and 1(D)). When nanoribbons were exposed to CPL for more than 96 h, they started to be thinner, but retained their twisted shape. After 50 h of photo-induced assembly and in the absence of further illumination, the nanoribbons retained their geometry for the entire project time (3.5 years).

Figure 1E:
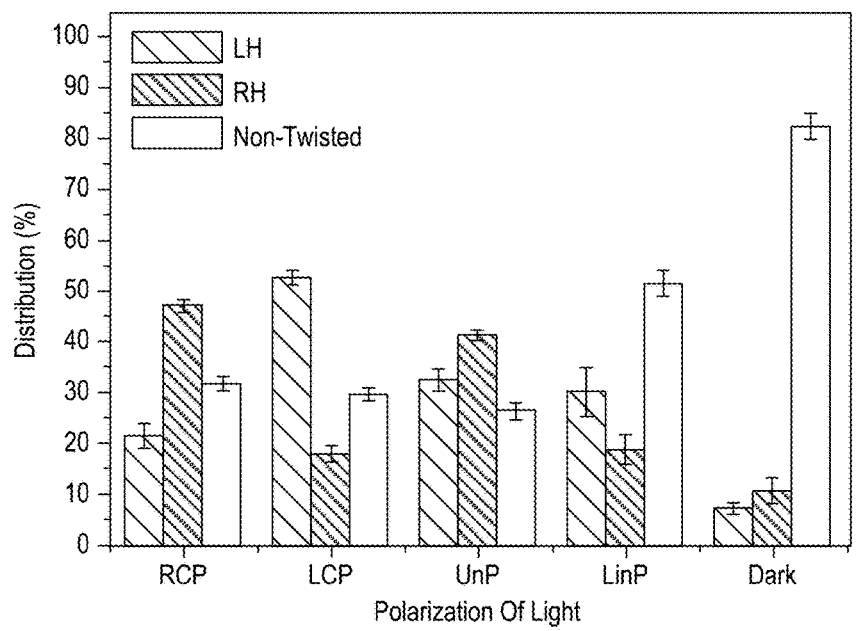
Figure 1F:
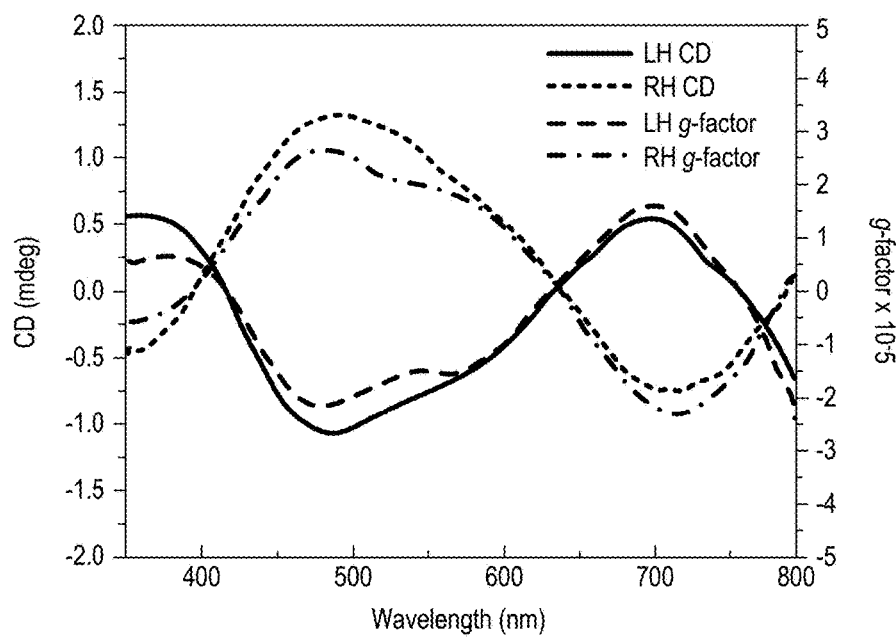

Circular polarization of light exhibited an enantio-selective photochemical influence on NP dispersions and on the geometry of the self-assembled nanoribbons. Under LCP illumination, predominantly left-handed (LH) nanoribbons were formed, as established by SEM (FIG. 1(A)). When the NP dispersion was illuminated with RCP, right-handed (RH) nanoribbons of otherwise similar dimensions prevailed (FIG. 1(B)). In both cases, the differences between LH and RH nanoribbon fractions obtained after analysis of 100 scanning electron microscopy (SEM) images of approximately 1000 nanoribbons were more than 30% (FIG. 1(E)), which was well in excess of the experimental error of about 5%. Note that this is also much higher than a typical enantiomeric excess in CPL-stimulated organic reactions (0.5-2%). The chiral preference in nanoribbon geometry was also confirmed by circular dichroism (CD) spectroscopy. CD spectra of purified nanoribbons were measured in aqueous dispersions and revealed distinct chiroptical bands at 490, 590, and 700 nm (FIG. 1(F)). Comparison of CD and absorption spectra after 50 h illumination indicates that the first two bands in CD spectra are associated with the absorption in the band-gap transition. Importantly, nanoribbon dispersions illuminated by LCP and RCP showed positive and negative CD signals, respectively. Transmission electron microscopy (TEM) tomography (FIGS. 2(A) and 2(B)), capable of visualizing 3D structures of the nanoribbons, corroborated the conclusions regarding their chiral shape. FIGS. 2(C) and 2(D) also show SEM images of a single LH nanoribbon (FIG. 2(C)) and a single RH nanoribbon (FIG. 2(D)).

A control experiment involving illumination with unpolarized light (UnP) showed equal distribution between right- and left-handed nanoribbons. Illumination with LinP as well as incubation in the dark yielded straight nanowires, which were the overwhelmingly dominant products in these two cases. Nanowires produced by exposure to UnP and LinP revealed no CD activity, consistent with the SEM data.

Another experimental series contributing to understanding of templating effect of photons on the mesoscale geometry of nanoribbons and nanowires was the illumination of CdTe dispersions with a different light source at 607 nm for 50 h. Compared to illumination at 543 nm, the efficiency of chiral induction by LCP is reduced as the difference between the yield of LH and RH nanoribbons drops to ~20%. This observation is consistent with the reduced intensity of NP absorbance at the fringes of the band gap transition.

Figure 2E:
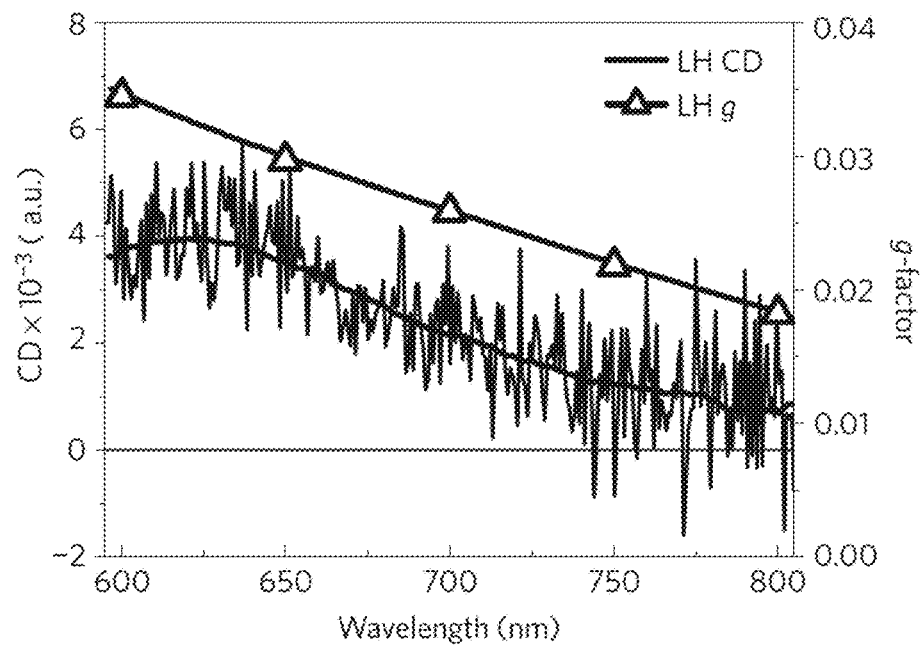
Figure 2F:
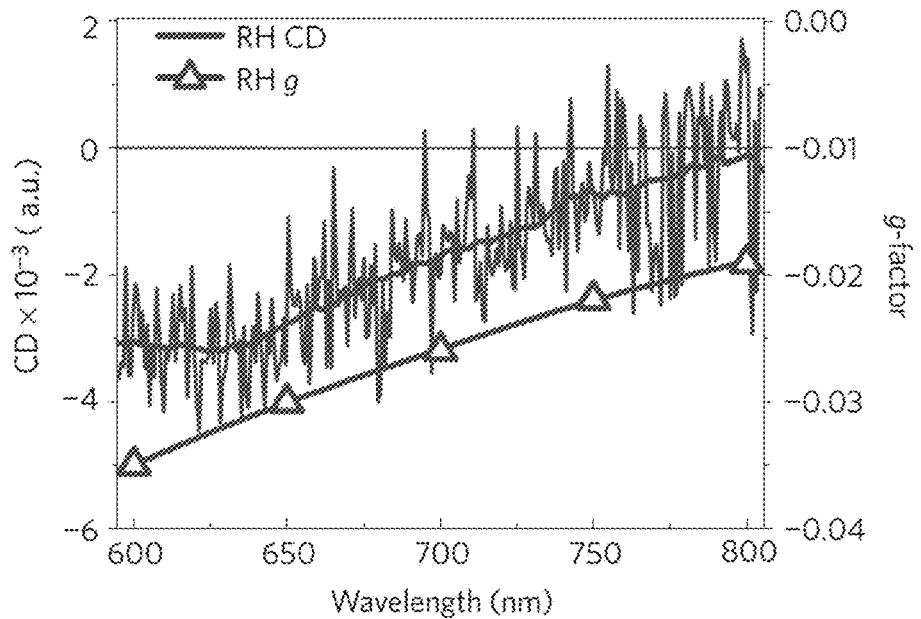
Figure 2G:
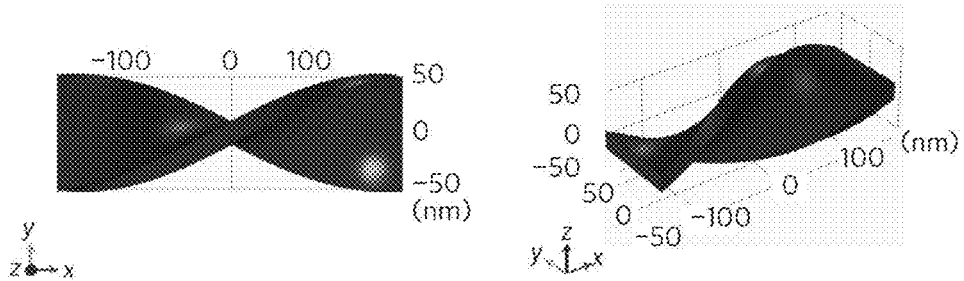
Figure 2H:
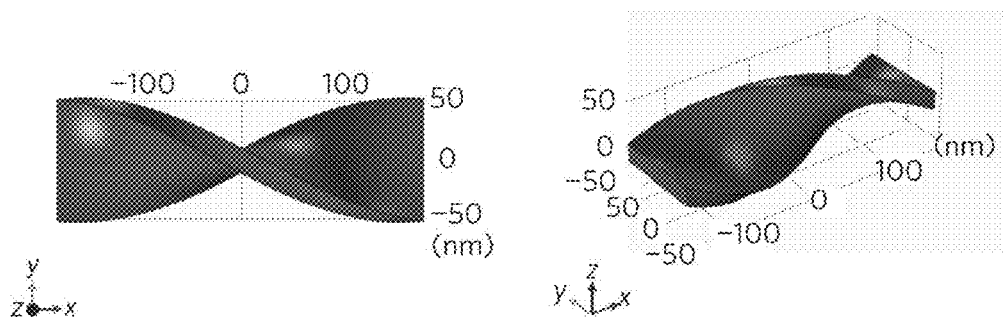

In order to avoid the effects of chirality arising from potential artifacts associated with the presence of small molecular weight compounds in solution, CD spectroscopy data of ensembles of chiral structures in dispersion is compared with CD measurements taken for single nanoribbons (FIGS. 2(E) and 2(F)) for the 600-800 nm spectral window. The single LH and RH nanoribbons revealed correspondingly positive and negative mirror-image CD signals. A band located at approximately 660-700 nm is spectrally similar to the band observed for dispersions (FIG. 1(F)); the effective spectral window of the quarter wave plate used prevents single particle CD measurements in the 400-600 nm region). CD spectra of the single twisted nanoribbons measured using dark field microscopy are dominated by light scattering. Therefore, the "red" CD bands in FIG. 1(F) should be predominantly attributed to scattering of LCP and RCP photons on twisted nanoribbons with specific handedness and, in fact, are may be considered in the framework of circular intensity differential scattering. As a control experiment against potential artifacts, CD spectra are measured from single nanoribbons at various rotational angles in respect to the long axis. The shape of CD spectra remained unchanged regardless of the nanoribbon orientation. As another control experiment, confirming attribution of the origin of the CD bands, nontwisted nanoribbons did not show any CD signals.

The chiroptical properties of the twisted nanoribbons can be compared with those of microscale gold helixes made by 3D lithography, which also exhibit broadband polarization rotation. Anisotropy factors of g=0.02-0.04 were obtained from numerical FEM solutions of the Maxwell equations for CdTe twisted ribbons models (FIGS. 2(E), and 2(F)), and are comparable to the values obtained for Ag-enhanced Au nanohelices and Au nanorods/fiber composites, g is about 0.025.

Figure 3A:
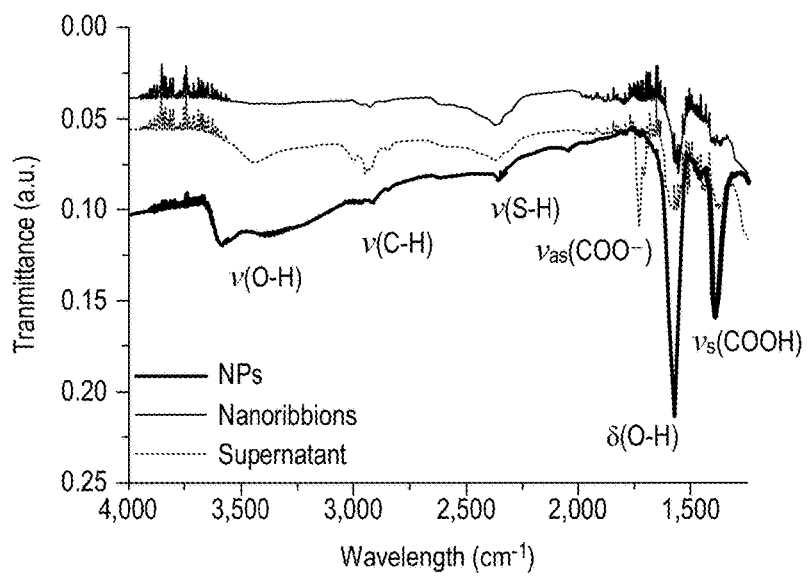
Figure 3B:
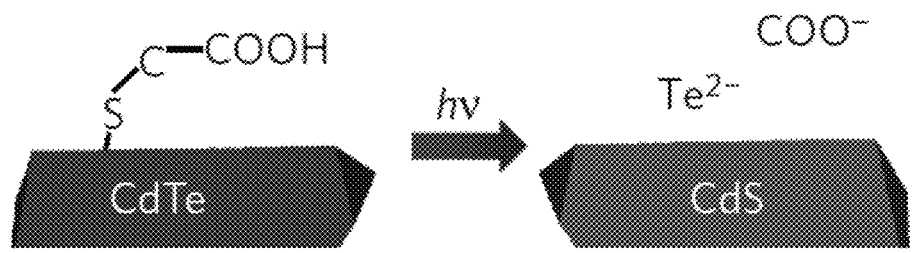

To understand how circular polarization of photons causes distinct permanent differences in shapes of nanoribbons, the mechanism of light induced self-assembly of CdTe NPs is first addressed. From the optical properties and the relative content of NPs in the supernatant of nanoribbons dispersions assembled with and without light, it becomes apparent that, along with the spontaneous self-assembly of NPs, there is a parallel light-stimulated process of the formation of twisted ribbons. FTIR peaks for $v(O—H)$, $\delta(O—H)$, $v_s(COOH)$ are found, which are characteristic of TGA ligand (located at 3500 $cm^{-1}$, 1567 $cm^{-1}$, and 1421 $cm^{-1}$, respectively), were drastically decreased for nanoribbons compared to the original CdTe NPs (FIG. 3(A)). A strong peak at 1722 $cm^{-1}$ corresponding to $v_{as}(COO^-)$ of carboxyl moieties was observed in the supernatant obtained after the separation of twisted nanoribbons and NPs by centrifugation. Concomitantly, the characteristic UV-Vis absorption peak of TGA at 276 nm decreased as illumination time increased, indicating its decomposition. The presence of an S 2p signal from CdS in the X-ray photoelectron spectra (XPS) of nanoribbons and the weakness of peaks for Te from CdTe indicate that illumination also results in the replacement of Te by S in the NPs; the elemental atomic composition of nanoribbons after 50 hours illumination were 51.5% Cd, 47.3% S, 1.2% Te. The mechanism of photo-induced replacement of Te by S in NPs is likely to involve ionic diffusion of $S^{2-}$ ions formed by photo-induced oxidation of TGA into the NPs. TEM of the twisted region, atomic mapping images, and energy dispersive spectroscopy (EDS) spectra confirmed the transformation of CdTe NPs into CdS NPs (FIG. 3(B)). These results are consistent with previous findings regarding formation of a thin CdS shell around CdTe NPs due to chemical decomposition of TGA and photo-induced oxidation of CdTe.

X-ray photoelectron spectroscopy spectra indicated that there was no significant difference in chemical composition of left and right-handed nanoribbons. Therefore, the assembly mechanism should be the same for RCP and LCP illumination. Spectroscopy and microscopy data suggest that the light-induced mechanism of nanoribbon self-assembly starts with the photo-induced decomposition of TGA to form $S^{2-}$ that subsequently replaces $Te^{2-}$ ions in NPs. See, e.g., FIGS. 3(A)-3(I). The loss of the already sparse TGA shell is likely to be the trigger of the light-induced NP assembly into twisted structures. Such attribution of the self-assembly mechanism encounters, however, an unexpected complication: the electrokinetic zeta-potential, $\zeta$, decreased from approximately −6 mV to approximately −15 mV upon illumination; such increase in electrostatic repulsion should hinder the assembly process contrary to the results observed. Calculations of the pair-potentials between the NPs using extended Derjaguin-Landau-Verwey-Overbeek theory (E-DLVO) help to explain this discrepancy and confirm the light-induced assembly mechanism. Even though the zeta-potential of "bare" CdS NPs is more negative, the loss of the TGA shell and increased ionic strength associated with the surface-ligand photooxidation makes the overall pair potential more attractive.

Based on the above results, the effect of circular polarization of incident light on NP self-assembly originates in the optically selective activation of nano structures with different handedness. Both individual CdTe NPs and their clusters can be chiral. As such, aberration corrected TEM tomography indicates the existence of chiral dislocations of atoms in Pt NPs. Chirality of individual Au NPs in racemic mixtures capped with achiral ligands was previously shown with liquid chiral chromatography. With the help of a high-angle annular dark field (HAADF) scanning transmission electron microscope (STEM) (FIGS. 3(G) and 3(H)), it was found that the TGA-stabilized NPs have the shape of truncated tetrahedrons. The distinct truncated tetrahedron shape of CdTe-TGA NPs was also seen in high-resolution TEM images (FIG. 3(I)). Four uneven truncations result in a chiral tetrahedron similar to a $sp^3$ hybridized carbon atom with three different substituents. To confirm the chirality of individual NPs, the dispersion of TGA-stabilized CdTe NPs is incubated with bovine serum albumin (BSA, 66.5 kDa) serving here as an enantio-selective absorber. After 5 hour of incubation, BSA is separated and unbound NPs using centrifugal membrane (50 kDa), and measured CD spectra of obtained dispersions. In contrast to the original CdTe NPs that has no CD signals and BSA that has a negative CD peak at around 215 nm, the separated NPs showed positive CD band at 400-550 nm coinciding with the excitonic transition of NPs. This observation indicates that the starting NP dispersion is a racemic mixture of NP enantiomers with different chirality that can be enantio-selectively separated.

Figure 3C:
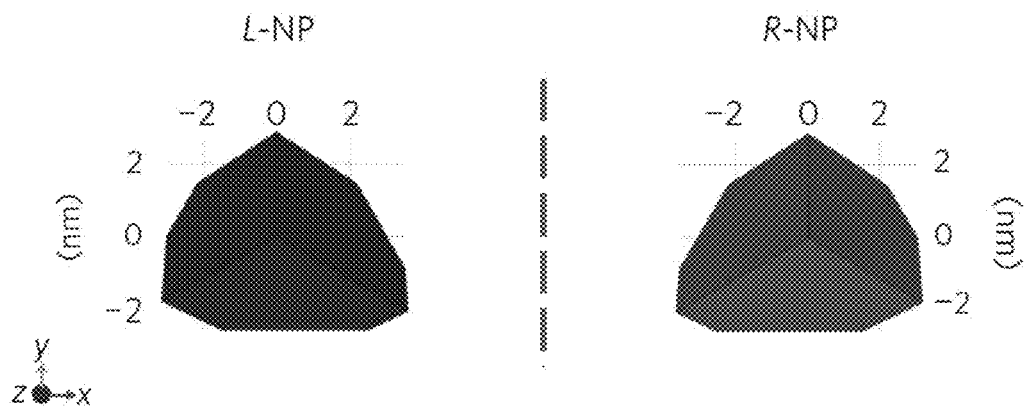
Figure 3D:
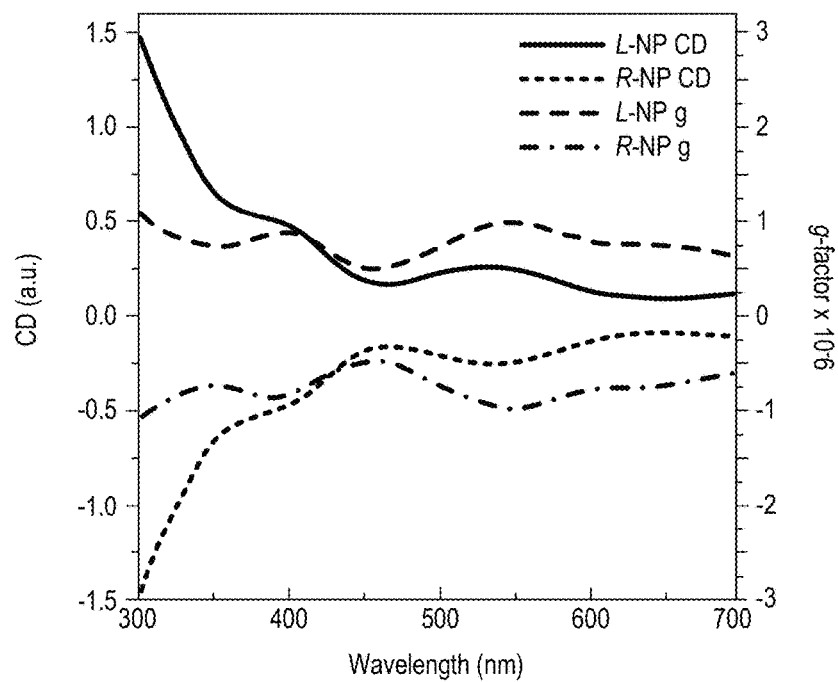
Figure 3E:
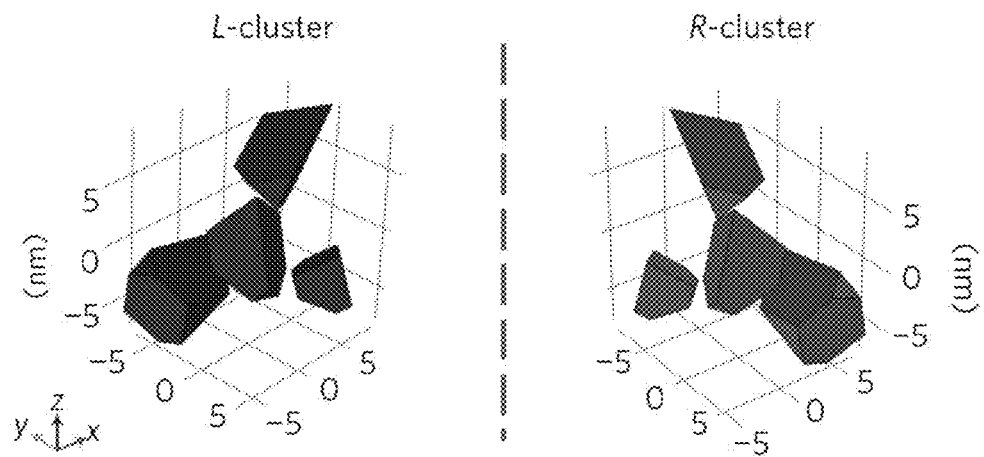
Figure 3F:
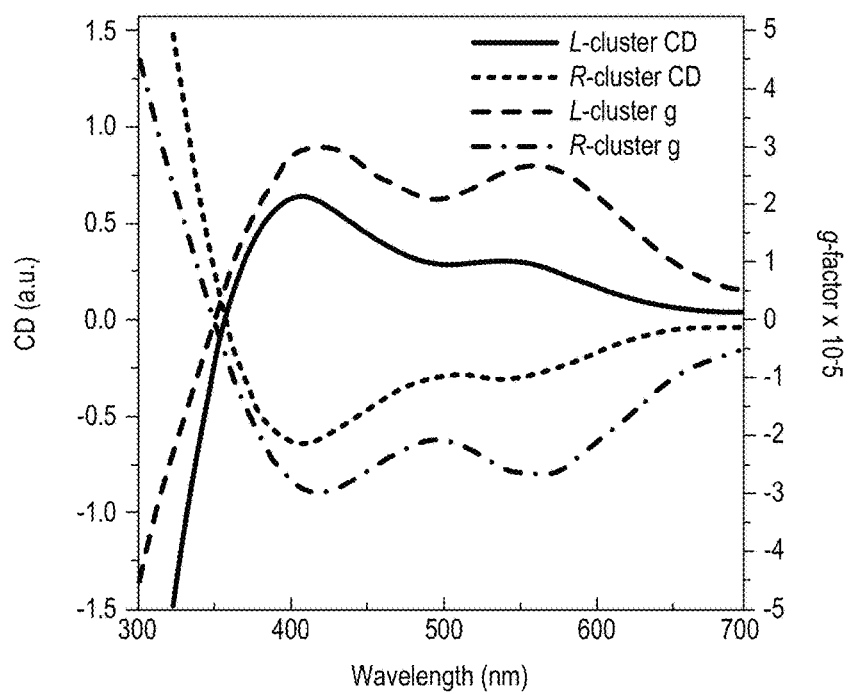
Figure 3I:
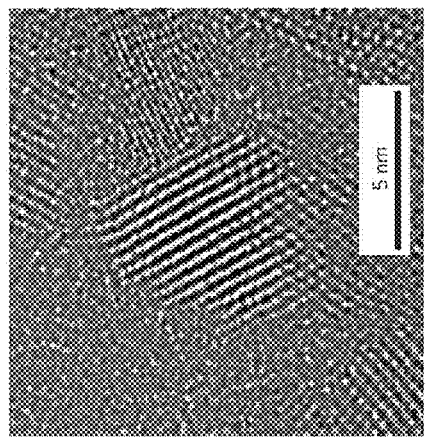
Figure 3H:
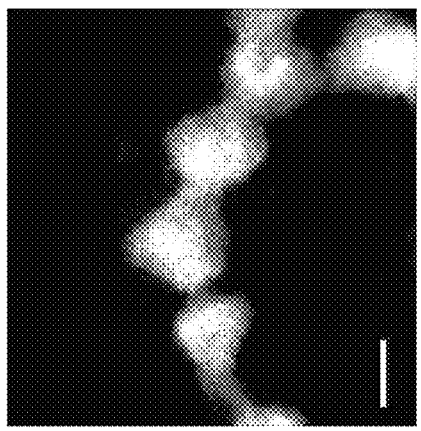
Figure 3G:
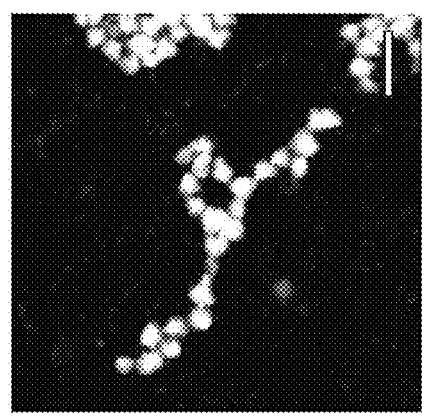

Simulation of light absorption showed that enantiomers of truncated NPs (FIG. 3(C)) should display optical activity, as reflected in the mirror-imaged simulated CD and g-factor spectra (FIG. 3(D)). Spontaneously formed small clusters of NPs similar to those in FIG. 3(G) can also be chiral. According to these simulations, the differences in absorption of LCP and RCP in such clusters (FIG. 3(F), see also simulation of chiral clusters in FIG. 3(E)) are even greater than in NPs (FIG. 3(D)). In both cases, there is a large difference in absorption of LCP and RCP at 543 nm for the nanostructures of different handedness used here.

Then, the mechanism of the chirality transfer from CPL to NP assemblies is believed to be as follows. The original CdTe NP solution is racemic, containing equal amounts of left- and right-handed particles and small clusters.

A schematic of a representative CPL-induced self-assembly process is shown in FIG. 9. At step 1, a racemic mixture of CdTe NPs is prepared. Step 2 applies left-handed circularly polarized light (LCP), while step 2' applies right-handed circularly polarized light (RCP). At step 2, LCP selectively activates LH NPs, while at step 2' RCP activates RH NPs. In step 3, the excited LH NPs are self-assembled into LH nanoribbons. At step 3', RH NPs are self-assembled into RH nanoribbons. Therefore, when a racemic mixture of CdTe NPs is illuminated by LCP at 543 nm, a subpopulation of LH NPs and clusters absorb light more effectively than RH NPs and clusters as shown at step 2 in FIG. 9. The same is true for RH NPs/clusters (step 2' in FIG. 9) when the dispersion is illuminated with RCP. The light-activated CdTe NPs undergo photooxidation of TGA stabilizers; this transforms them into "bare" CdS NPs. Photooxidation of multiple TGA ligands on the surface of NPs requires multiple photons and, therefore, the difference in the probability of absorption of L-photons and R-photons multiplies over time. This process "locks in" and amplifies the differences between the NPs of opposite chirality in the initially racemic mixture.

The ligand-free CdS NPs display a much stronger propensity to self-assemble than ligand-protected, non-light-activated CdTe NPs of opposite handedness. Because the self-assembly of NPs is very sensitive to the anisotropy of NP interactions, the chirality of the constituent building blocks is reflected in the helicity of the resulting assemblies as occurs with the self-assembly of organic and biological macromolecules.

Figure 4A:
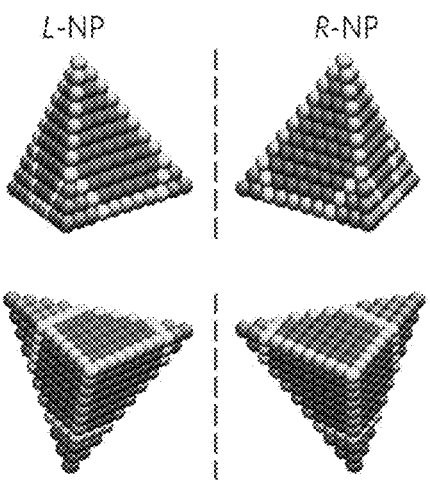

Atomistic molecular dynamics (MD) simulations were performed to further clarify the origin of the observed ribbon helicity. Individual NPs were modeled as slightly smaller 3.6 nm tetrahedrons with a cubic CdS crystal lattice and a lattice constant of a=0.582 nm (FIG. 4(A)). The tetrahedrons were asymmetrically truncated by the removal of 2, 3, and 4 atom layers from three of the NP vertices to acquire a left or right chirality. The NPs surfaces were not coated with stabilizers, in accordance with the experimental results presented in FIGS. 3(A)-3(I), indicating ligands removal in the process of photo activation. However, the large CdS lattice polarity was reduced at the NP surfaces to one-half of the vacuum value to account for the potential presence of residual ligands. NPs at different (homogeneous) charging states were simulated in accordance with experimental observations. The MD simulations were carried out with explicit water molecules and Cl⁻ counter ions of the charged NPs (FIG. 4(A) to precisely describe the solvent environment of the NP self-assembly process.

Figure 4B:
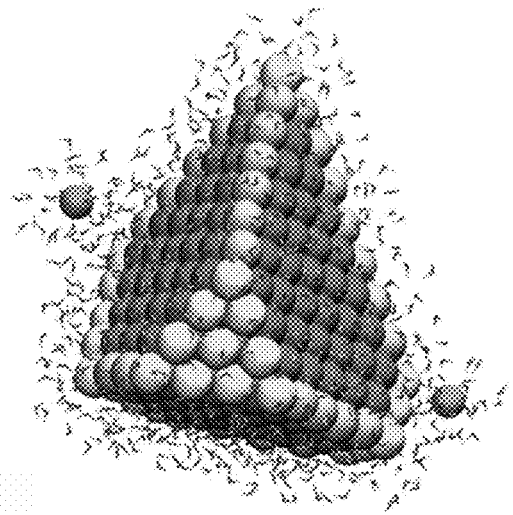
Figure 4C:
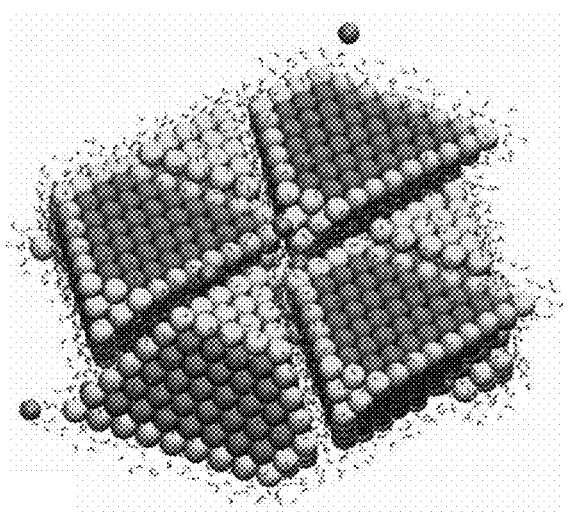
Figure 4D:
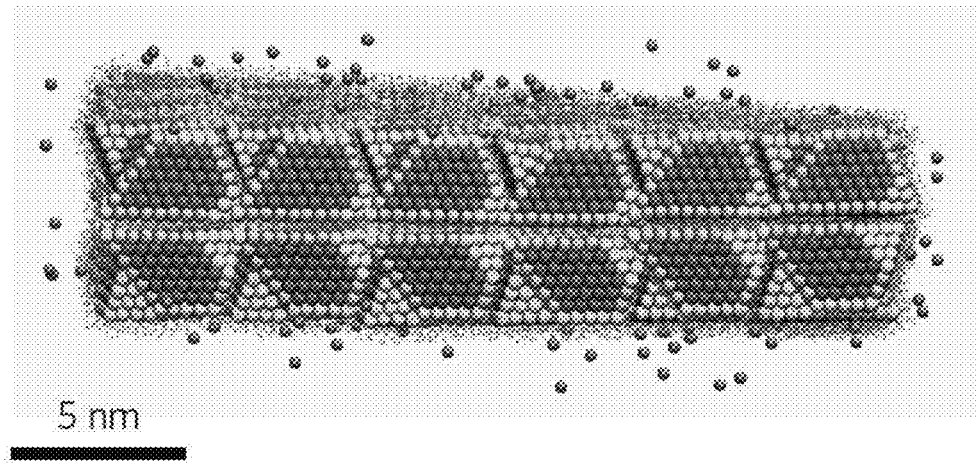
Figure 4E:
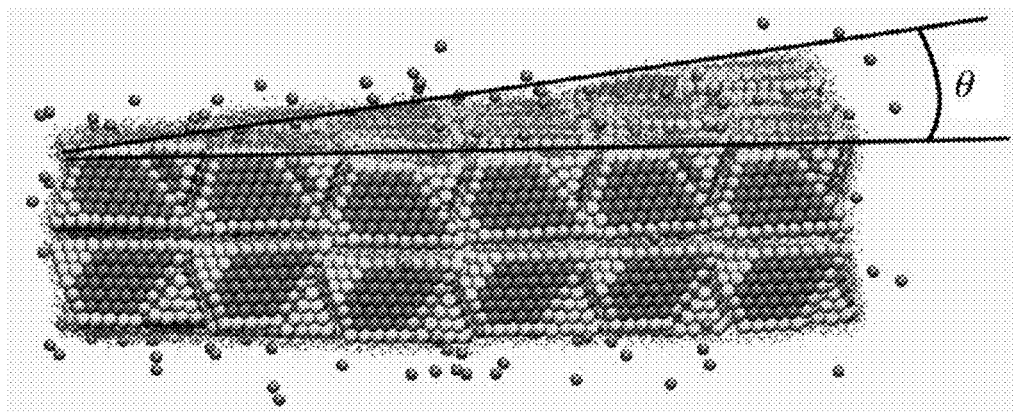

Initially, NPs of the same (L or R) handedness (FIG. 4(B)) were preassembled into a planar piece of nanoribbon (FIG. 4(C)) with packing similar to that observed before, assuming that NPs of predominantly one handedness were prepared by photoexcitation with a circularly polarized light and self-assembled. Upon equilibration of the NP assemblies in an isothermal-isobaric ensemble at T=300 K for ~5-10 ns, the planar nanoribbons acquired distinct twists. Importantly, the twist was opposite for NPs with opposite handedness. The average twist angle observed in the simulation of the nanoribbons made from CdS NPs was −3.1° and +4.3° for LH and RH NPs (FIGS. 4(D) and 4(E)), respectively, which corresponds to a pitch length of about 1,400-1,900 nm similar to the experimental pitch length of nanoribbons observed after 28 h illumination in FIGS. 1(A)-(B) and 2(A)-2(H), by way of example.

These observations confirm the significance of NP chirality in guiding ribbon assembly and the realism of photon-matter chirality transfer via the geometry-specific photo activation of NPs. The MD simulations indicate that the chirality of the individual NPs translates into a twist of the nanoribbons because of cooperative interactions with the NP ensemble. Besides unequal truncations, this phenomenon may be associated with other chiral geometries and multiple interparticle interactions. Water molecules facilitate this process in all these cases by forming a soft "cushion" layer between NPs, enabling their restricted mobility. Translation and reorientation of NPs creates the possibility of ensemble-energy minimization in accordance with the chiral bias. The experimental structures are partially disordered, owing to fluctuations in NP size, which translate into some variability of the pitch and of the non-close packing of the NP lattice in the ribbon.

Figure 4F:
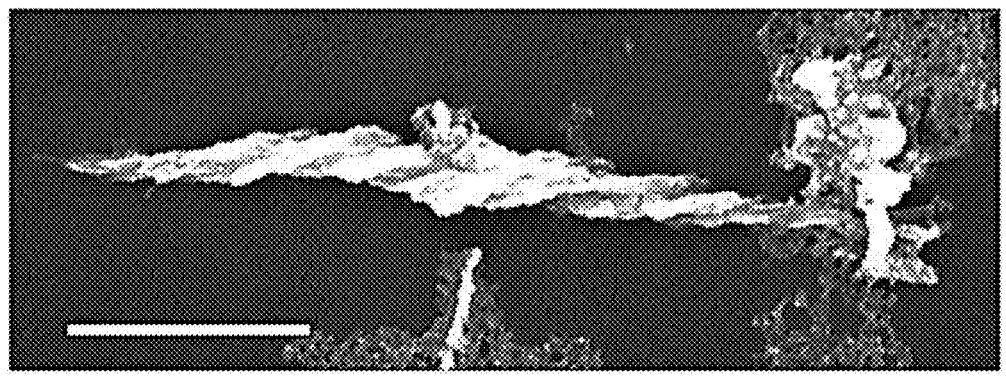
Figure 4G:
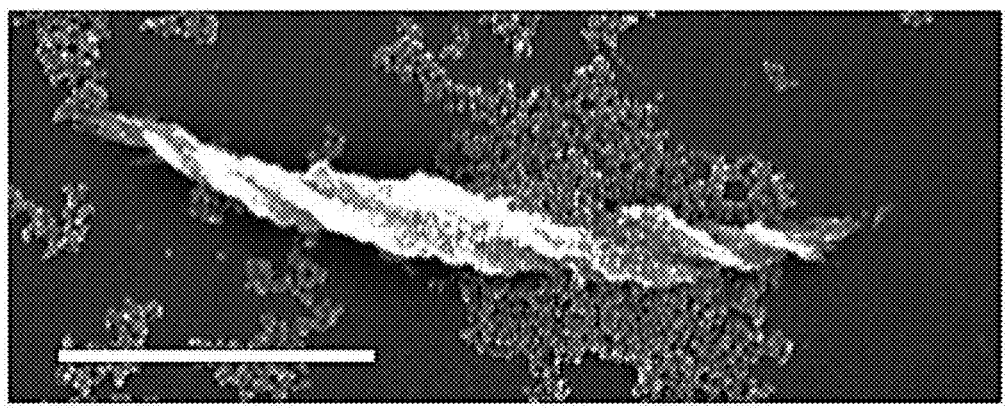
Figure 5A:
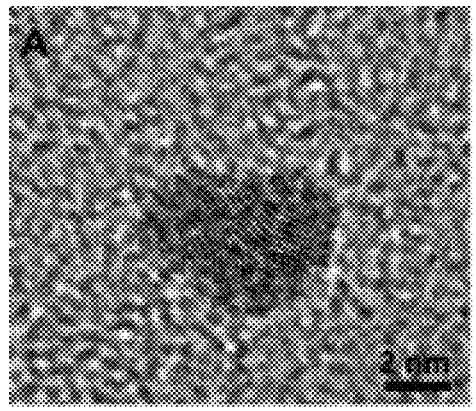
Figure 5B:
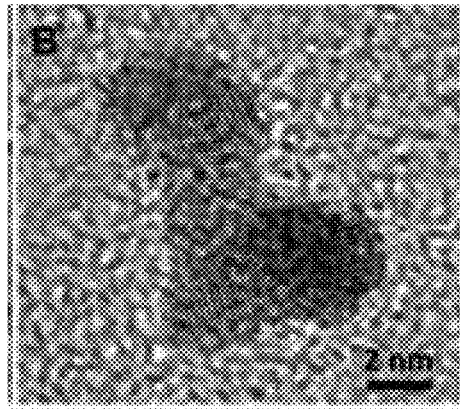
Figure 5C:
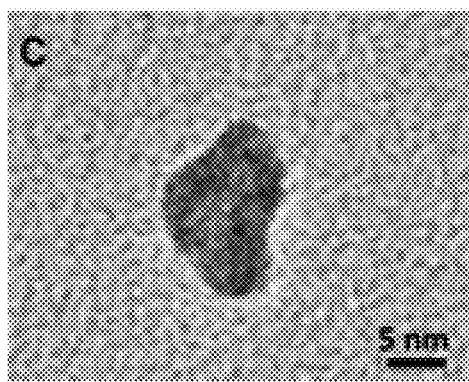
Figure 5D:
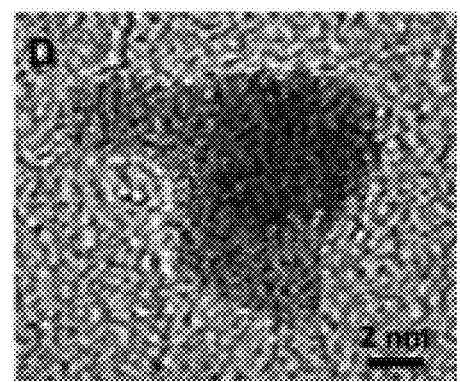

A vivid experimental demonstration of subtle differences in interparticle interactions between a priori chiral NPs leading to nanostructures with different chirality can be obtained for NPs with a stabilizing ligand made from D- and L-cysteine (FIGS. 4(F) and 4(G)). These originally chiral NPs were self-assembled in the dark, and produced submicron helices with distinctly different twist directions depending on the chirality of the building blocks.

Thus, it is demonstrated in accordance with certain principles of the present disclosure that circular polarization of light can strongly influence assembly of nanoscale structures by altering the chirality of NPs participating in the self-assembly process. Because light sensitivity is common in NPs, such techniques offer new methods of synthesis for chiral nano structures using light as the primary chiral bias determining the asymmetry in the enantiomeric mixture of the products. Notably, the resulting structures exhibit hierarchical chirality across different scales—molecular, nanoscale and mesoscale—reminiscent of the propagation of chiral asymmetry in biological assemblies. Furthermore, astronomical data indicate that mesoscale and nanoscale particles are present in space, whereas geologic records suggest that inorganic NPs were present in primordial Earth conditions; therefore, selective photonic activation of seemingly achiral NPs might have played a role in the origin of homochirality on Earth. This role can be associated with a large variety of catalytic, optical and colloidal processes possible for semiconductor and other nanoparticles under stellar and planetary conditions. Large enantiomeric excesses observed for CPL-induced NP assemblies (FIG. 1(E)), exceeding those of known photo-induced reactions in simple organic molecules are also contemplated. Facilitation of the transition of chiral prebiotic structures with preset enantiomeric excess from the molecular scale of early amines, amino acids, thiols and the like, to the nanometer scale of early biopolymers or organelles may also be considered.

As noted above, conventionally, chiral ligands were required to synthesize chiral nanoparticles, such as gold (Au) NPs. Recently, the chirality of Au NPs has actively studied due to its possibilities in catalysis and sensing applications. For example, in certain conventional techniques, L-glutathione ligand is used for synthesizing chiral ultrasmall Au NPs, which exhibited strong optical activity. Interestingly, CD signals were observed not only from the chiral ligand itself, but also from surface plasmon resonance region, which manifested in the metal-based electronic transition in the visible region. This optical activity can be caused by a number of effects. To explain the origin of chirality in Au clusters, several models have been proposed: (1) the Au core is intrinsically chiral; (2) intrinsic core is not chiral but its electrons are trapped in dissymmetric electric field due to influence of adsorbed chiral ligand on the surface; (3) an inherently achiral core but the surface footprint the chirality of absorbed chiral ligand. However, none of these mechanisms were clearly assessed, because prior to the present teachings, chiral metal nanoparticles could not be synthesized without help of chiral ligand. Optical activity was only reported for metal nanoparticles synthesized by chiral enantiopure ligands, because previously only chiral ligands could induce chirality to the protected metal nanostructures.

In another variation of the present disclosure, stable chiral Au NPs are synthesized using circularly polarized light (CPL) without any chiral ligands. Circularly polarized light (CPL) is a new tool to transfer spin angular momenta of photon to matter, retaining the chiral information as a permanent structure. Because nano-scale materials have stronger interactions with light energy than small organic molecules, CPL can be used with versatile inorganic structures, which could not been obtained using organic molecules. Effective influence of photon energy on plasmonic metal NPs can be expected based on previous studies including the photochemical synthesis of Ag nanoprisms. Via a light-activated two-dimensional coalescence mechanism, seed spherical Ag nanoparticles transformed to nanoprisms. In accordance with certain aspects of the present disclosure, CPL is used as a chiral induction reducing agent to synthesize chiral Au NPs, without the use or assistance of chiral molecules or ligands.

For example, CPL reduces $HAuCl_4$ in water, while also providing chirality as it reduces Au NPs. The optical activity was detected in the visible range, indicating the formation of a new type of chiral NPs capped by achiral molecules. As Au precursors and capping agent, $HAuCl_4$ and citrate are used. In a quartz cuvette, 2 mL aqueous solution of $HAuCl_4$ and citrate (2.5 mM each) was placed and illuminated by left- (LCP) or right-handed circularly polarized light (RCP) with a wavelength of 543 nm.

After 50 min illumination, the color of solution turned into red, which indicates formation of plasmonic Au NPs. The morphology of obtained NPs was observed using transmittance electron microscopy (TEM) (FIGS. 5(A)-5(D)) interestingly, the shape of NPs was not a typical sphere, but v-like twisted structures that were about 10 nm.

Figure 6:
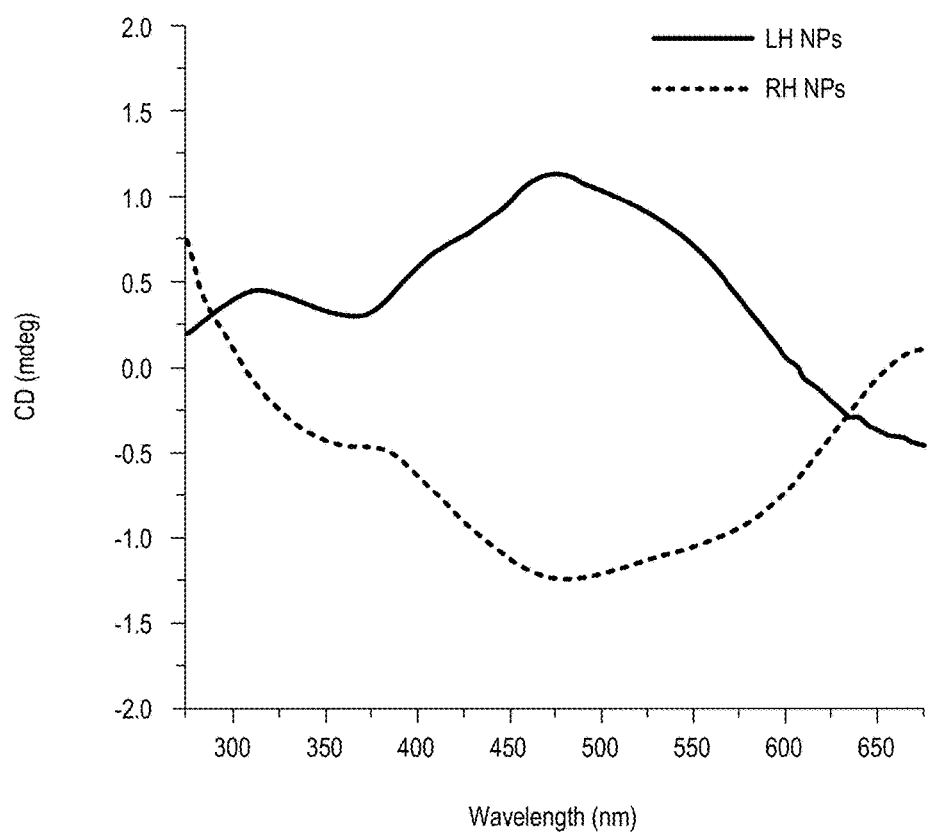

To understand the intermediate stages of chiral growth of Au NPs, TEM images are measured at various illumination times (FIGS. 7(A)-(C)). After 5 min of illumination (FIG. 7(A)), spherical approximately 2 nm NPs were observed, and with continuous illumination, the NPs were elongated anisotropically (FIGS. 7(B)-(C)). Corresponding plasmonic optical activity signals were observed at around 500 nm (FIG. 6). Control experiments have also been carried out to examine CPL effects on already reduced Au NPs capped with citrate. CPL is illuminated on Au NPs solution for up to three days, and then measured CD spectra of the solution. As expected, optical activity was not observed.

Photo reduction or laser photolysis of $HAuCl_4$ in water has been well studied. Excitation of $HAuCl_4$ solutions by energetic photons results in irreversible reduction of Au complexes. The photoinduced reactions in this system are believed to be as follows:

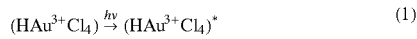  (1)

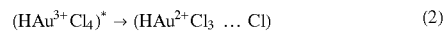  (2)

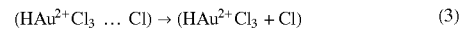  (3)

  (4)

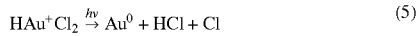  (5)

  (6)

It has been explained by formation of a caged divalent gold complex (Equation (2)) following excitation (Equation (1)). The complex then dissociates (Equation (3)) and disproportionates (Equation (4)). The long-term buildup of stable absorbance is due, of course, to colloidal gold formation (Equation (6)), subsequent to the reduction of the gold monocation (Equation (5)).

It has been demonstrated using transient absorption spectra that the $Au^{3+}$ reduction to $Au^0$ is a multiphoton event. These experimental results confirm that circularly polarized momenta of photons can be transferred to the sequential light-induced reduction procedures. Such techniques can thus be used with other inorganic compositions to induce long-term chirality to nanoparticles, as desired.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of forming a nanoparticle composition, the method comprising:
    directing circular polarized light towards nanoparticle precursors to cause a photo-induced reaction of the nanoparticle precursors that induces chirality therein to form a plurality of chiral nanoparticles comprising a light-absorbing material selected from the group consisting of gold, silver, copper, nickel, iron, platinum, silicon, CdTe, CdSe, CdS, HgTe, HgSe, HgS, PbTe, PbSe, PbS, $MoS_2$, $FeS_2$, FeS, FeSe, and combinations thereof, wherein the plurality of chiral nanoparticles comprise left handed nanoparticles or right handed nanoparticles in an enantiomeric excess of greater than or equal to about 30% and each nanoparticle of the plurality is substantially free of any chirality-inducing ligands.

2. The method of claim 1, wherein the nanoparticle precursors comprise a first component for forming the chiral nanoparticle and a second component that serves as a capping agent on the chiral nanoparticle.

3. The method of claim 1, wherein the nanoparticle precursors are a dispersion of a first component for forming the chiral nanoparticles in an aqueous medium.

4. The method of claim 1, wherein the nanoparticle precursors comprise an element selected from the group consisting of: gold, cadmium, silver, copper, nickel, iron, platinum, silicon, mercury, lead, molybdenum, iron, and combinations thereof.

5. The method of claim 1, wherein the chiral nanoparticles are selected from the group consisting of: gold, CdTe, CdSe, CdS, and combinations thereof.

6. The method of claim 1, wherein the chiral nanoparticles are in a form of a nanoribbon.

7. The method of claim 1, wherein the chiral nanoparticles have a length of greater than or equal to about 2 nm to less than or equal to about 5 µm.

8. The method of claim 1, wherein the circular polarized light is a left-handed circular polarized light, so that the directing of the circular polarized light induces left-handed chirality in the chiral nanoparticles.

9. The method of claim 1, wherein the circular polarized light is a right-handed circular polarized light, so that the directing of the circular polarized light induces right-handed chirality in the chiral nanoparticles.

10. The method of claim 1, wherein the chiral nanoparticles are stable and maintain their chiral properties for greater than or equal to about 3 years.

11. A nanoparticle composition comprising:
a plurality of chiral nanoparticles comprising a light-absorbing material selected from the group consisting of: gold, silver, copper, nickel, iron, platinum, silicon, CdTe, CdSe, CdS, HgTe, HgSe, HgS, PbTe, PbSe, PbS, $MoS_2$, $FeS_2$, FeS, FeSe, and combinations thereof,
wherein the plurality of chiral nanoparticles comprise left handed nanoparticles or right handed nanoparticles in an enantiomeric excess of greater than or equal to about 30% and each nanoparticle of the plurality is substantially free of any chirality-inducing ligands.

12. The chiral nanoparticle composition of claim 11, wherein each chiral nanoparticle of the plurality is selected from the group consisting of: gold, CdTe, CdSe, CdS, and combinations thereof.

13. The chiral nanoparticle composition of claim 11, wherein the plurality of chiral nanoparticles comprises left-handed nanoparticles in the enantiomeric excess.

14. The chiral nanoparticle composition of claim 11, wherein each chiral nanoparticle of the plurality is stable and maintains its chirality for greater than or equal to about 1 year.

15. The chiral nanoparticle composition of claim 11, wherein each chiral nanoparticle of the plurality is stable and maintains its chirality for greater than or equal to about 3 years.

16. The chiral nanoparticle composition of claim 11, wherein the plurality of chiral nanoparticles comprises right-handed nanoparticles in the enantiomeric excess.

17. A nanoparticle composition comprising:
a plurality of chiral nanoparticles each in the form of a nanoribbon and comprising a light-absorbing material selected from the group consisting of: gold, silver, copper, nickel, iron, carbon, platinum, silicon, CdTe, CdSe, CdS, HgTe, HgSe, HgS, PbTe, PbSe, PbS, $MoS_2$, $FeS_2$, FeS, FeSe, and combinations thereof,
wherein the plurality of chiral nanoparticles comprise left handed nanoparticles or right handed nanoparticles in an enantiomeric excess of greater than or equal to about 30% and each nanoparticle of the plurality is substantially free of any chirality-inducing ligands.

* * * * *